May 10, 1932.    P. O. UNGER    1,857,988
CHAIN POST AND METHOD OF MAKING THE SAME
Filed Sept. 27, 1930
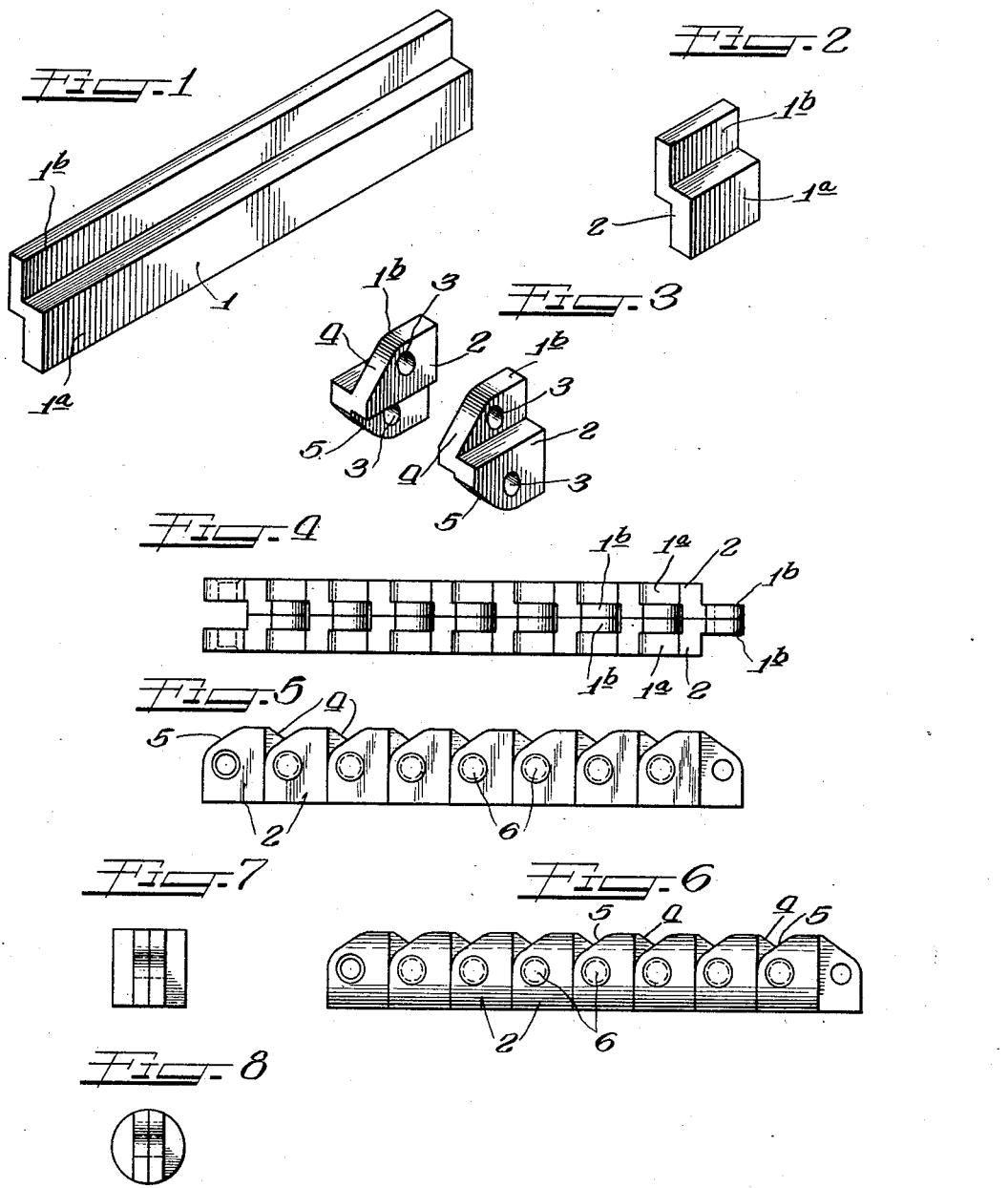
Inventor:
Paul O. Unger.

Patented May 10, 1932

1,857,988

UNITED STATES PATENT OFFICE

PAUL O. UNGER, OF CHICAGO, ILLINOIS, ASSIGNOR TO WILSON-JONES COMPANY, OF CHICAGO, ILLINOIS, A CORPORATION OF MASSACHUSETTS

CHAIN POST AND METHOD OF MAKING THE SAME

Application filed September 27, 1930. Serial No. 484,926.

This invention relates to a chain post and the method of making the same, and concerns itself primarily with the idea of simplifying and cheapening the process heretofore used.

The invention comprises the novel method and structure hereinafter described and more particularly pointed out and defined in the appended claims.

In the accompanying drawings, which illustrate a preferred form of this invention and in which similar reference numerals refer to similar features in the different views:

Figure 1 is a perspective view of a metal bar from which the chain links are made.

Figure 2 illustrates one-half of a link of the chain which is severed from the bar shown in Figure 1.

Figure 3 illustrates a pair of half-links similar to the one shown in Figure 2, which are apertured and ready for assembly for forming the chain.

Figure 4 is a top plan view of a chain constructed from the links shown in Figure 3.

Figure 5 is a side elevational view of the chain shown in Figure 4.

Figure 6 is a view similar to Figure 5, showing the chain after it has been made into circular rod-like form.

Figure 7 is an end view of the structure shown in Figure 5.

Figure 8 is an end view of the completed chain shown in Figure 6.

According to this invention a metal bar having an offset flange is formed or provided and suitable links are severed from this bar, and these links are beveled and suitably apertured for assembly purposes. Each link of the chain consists of a pair of complemental sections, which, when brought together in the proper relation, presents a tongue at one end and a groove at the other end for connection to adjacent links. After a chain has been constructed from such links, it is made into cylindrical rod-like form in a machine or the like.

In referring to the drawings, the reference numeral 1 denotes the metal bar from which the link members are cut. This bar 1 consists of a body portion 1a and an offset flange 1b which is parallel to the body portion 1a. Suitable pieces 2, as shown in Figure 2, are cut from the bar 1, and these pieces are beveled as indicated at 4 and 5 and apertured as indicated at 3 for assembly purposes. When a sufficient number of pieces have been cut from the metal bar 1 and these pieces have been apertured and beveled as required, the same may be assembled by bringing together two pieces with the offset flanges 1b in abutting relation to form a suitable tongue or tenon at one end thereof and leaving a groove or mortise at the other end for receiving the tongue of an adjacent link, and pivoting the links together by pivots 6.

When a series of links have been assembled, as shown in Figures 4 and 5, the chain is made into cylindrical or rod-like form by passing the same through a suitable machine or in any other suitable way.

In the construction of the chain, the tongue portions 1b of the links and the body portions are reversely beveled at the bottom portions thereof, in order that the links may be pivoted together upon substantially center line whereby the chain will not present such a broken effect upon its top portion when flexing.

It will be appreciated that these beveled portions will allow the links to flex or tumble upon a shorter radius than would be the case if the pivots extended through the links below the center line thereof. It will be noted that each link of the chain consists of a pair of complemental sections oppositely beveled upon their lower sides and, when brought into proper assembled relation, present a tongue or tenon at one end and a groove at the other end for assembly purposes without requiring any machining for the purpose of providing tongues and mortises as in the past.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The herein described method of forming a chain post which consists in severing a plurality of equal links from a metal bar having an offset flange, beveling said links, aperturing the same, assembling the same into a chain and forming the chain into a cylindrical rod-like member.

2. The method of forming a post chain which consists in forming a member with an offset flange, shearing said member into a plurality of link members, beveling and aperturing said link members, connecting said link members in pairs to form a chain, and rounding said chain into a cylindrical rod-like member.

3. The herein described method of forming a chain post which consists in forming a metal bar with an offset flange, shearing link members therefrom, beveling and aperturing said link members and connecting the same in pairs to form a chain.

4. The method of forming a chain post which consists in forming a bar with an offset flange, shearing said bar transversely into a plurality of link members, aperturing said members, and connecting said link members in pairs with the offset flanges of each pair in contacting relation.

5. The method of forming a chain post which consists in forming a bar with an offset flange, shearing said bar into a plurality of link members, aperturing said link members, connecting said link members in pairs with said offset flanges in contacting relation, and rounding said chain into a cylindrical rod like member.

In testimony whereof I have hereunto subscribed my name at Chicago, Cook County, Illinois.

PAUL O. UNGER.